July 21, 1964 L. DRAGONUK 3,141,559
UNIVERSAL LOADER
Filed Dec. 31, 1962 3 Sheets-Sheet 1
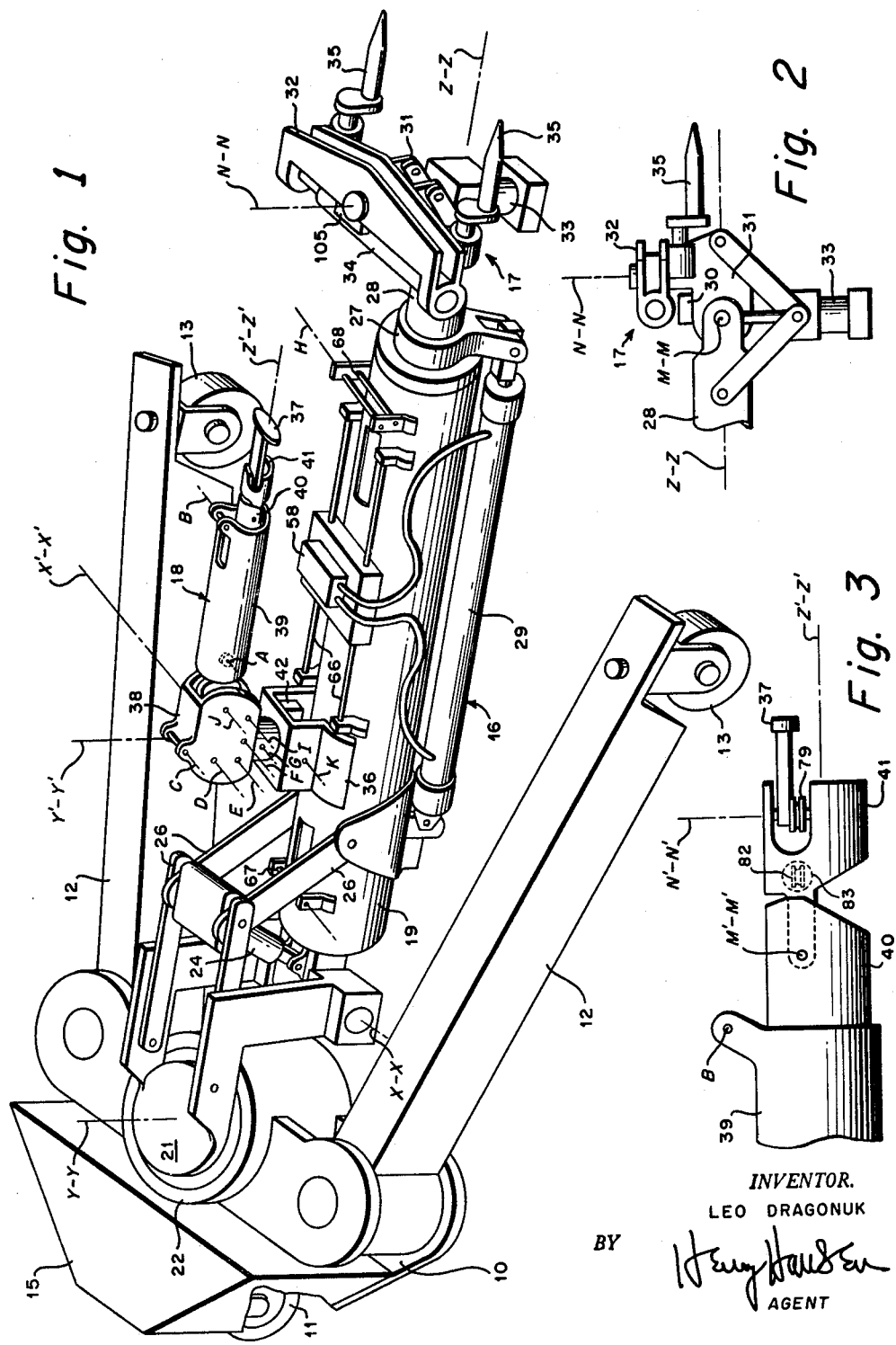
INVENTOR.
LEO DRAGONUK
BY Henry Hauser
AGENT July 21, 1964 L. DRAGONUK 3,141,559
UNIVERSAL LOADER
Filed Dec. 31, 1962 3 Sheets-Sheet 2
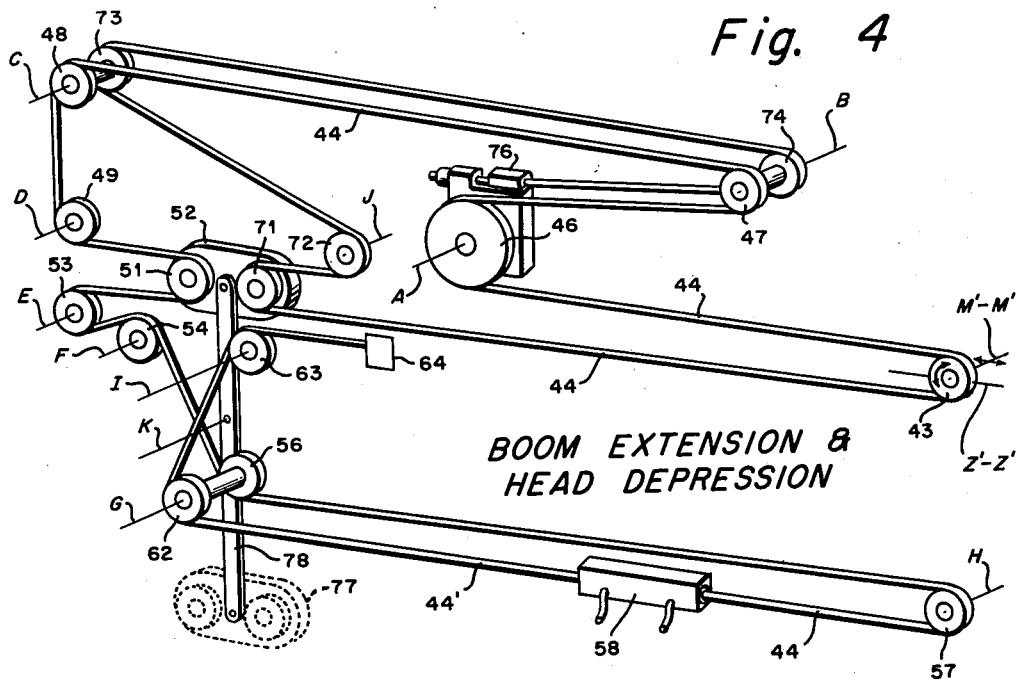
Fig. 4 — BOOM EXTENSION & HEAD DEPRESSION
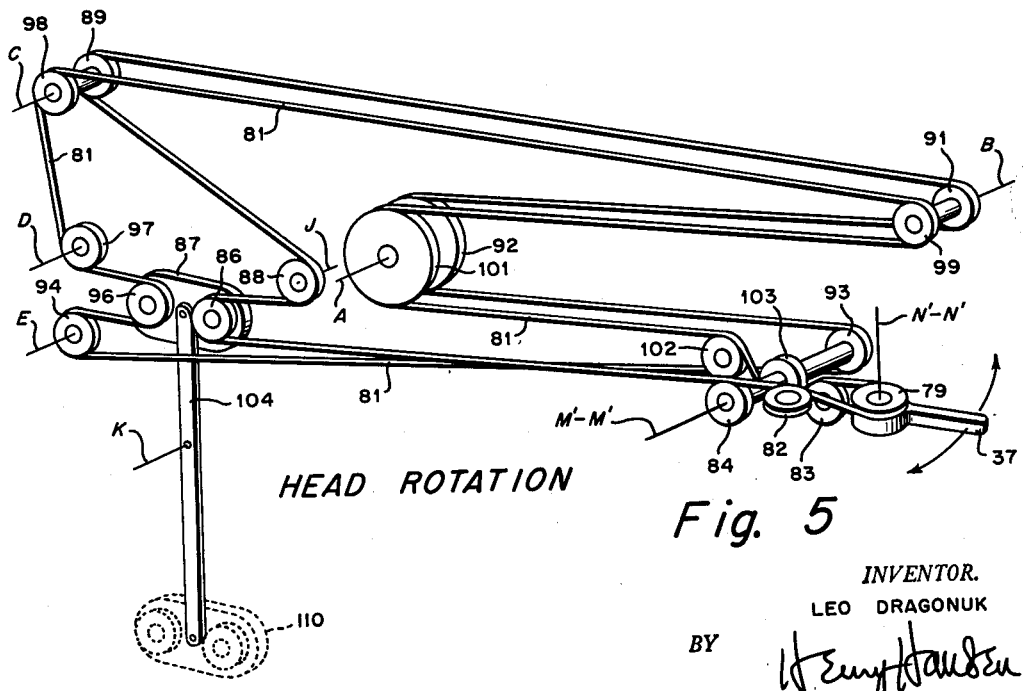
Fig. 5 — HEAD ROTATION
INVENTOR.
LEO DRAGONUK
BY
AGENT

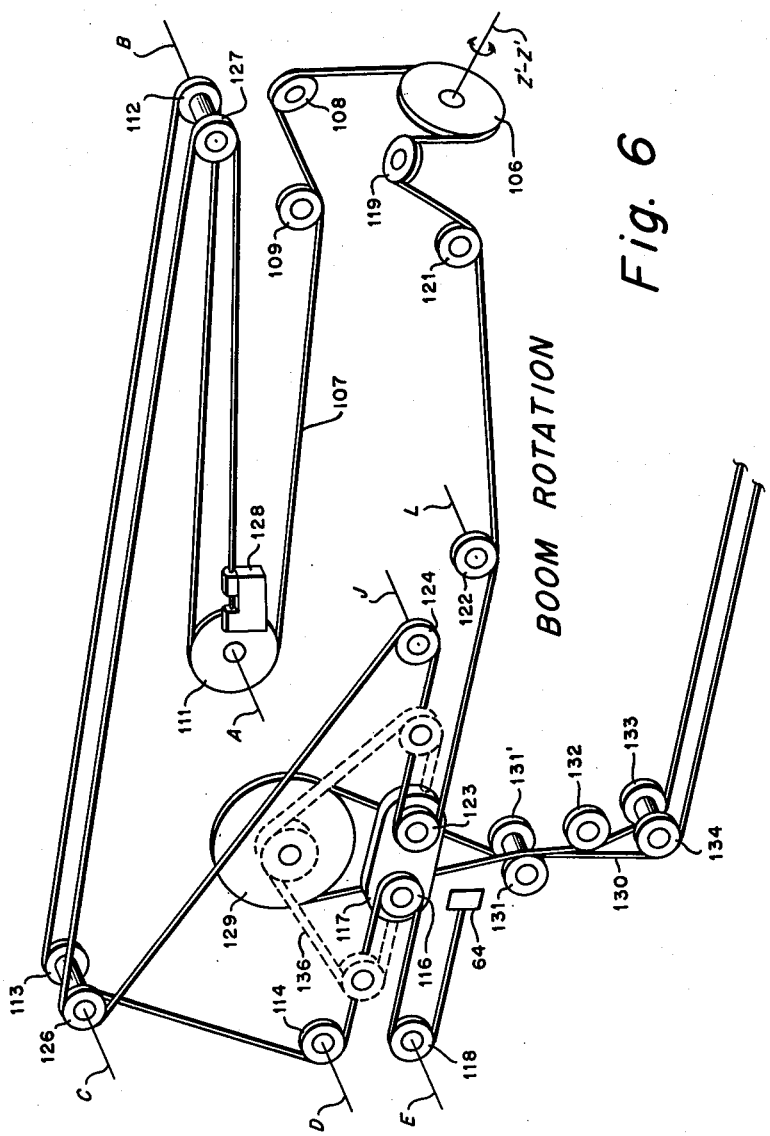

United States Patent Office 3,141,559
Patented July 21, 1964

3,141,559
UNIVERSAL LOADER
Leo Dragonuk, Plymouth Meeting, Pa., assignor to the United States of America as represented by the Secretary of the Navy
Filed Dec. 31, 1962, Ser. No. 248,819
6 Claims. (Cl. 214—1)
(Granted under Title 35, U.S. Code (1952), sec. 266)

The invention described herein may be manufactured and used by or for the Government of the United States of America for governmental purposes without the payment of any royalties thereon or therefor.

This invention relates to material handling apparatus and more particularly to a mobile extensible-boom loader and control therefor in which a load supported at the outer end thereof can be universally moved to any desired position and orientation.

Certain types of material handling operations, such as aircraft weapons loading, require versatile, rapid and precise load positioners. In boom-type loaders, versatility depends upon the number of degrees of motion which can be imparted to the load supported at the outer end thereof, and the rapidity and precision with which the load can be positioned depends upon the power mode employed and degree of sophistication in the control system therefor. An important feature often lacking in such apparatus is a capability for manipulating heavy loads at the end of the boom according to the instinctive tendencies of its human operator. That is, it is extremely desirous that a loader be capable of instantaneously responding to the natural human reactions of the operator produced from his observation of the loading process. One such material handling apparatus and control system therefor known in the prior art which permits the instinctive manipulation of the load at the end of a boom is disclosed in U.S. patent application Serial No. 88,587, for Omnidirectional Manipulator, by Paul Karnow et al., filed February 10, 1961, now U.S. Patent 3,087,630, issued April 30, 1963. The control systems of the prior art, however, provide no mechanical feedback of position information, or so-called follow-up, from the load to the manipulator whereby positive load positioning is achieved. The follow-up control mode was heretofore restricted to simple loading mechanisms wherein separate manipulators for each degree of loader motion, separate and distinct from the others, were used. Where only one manipulator was used, any control action imparted for one degree of motion would disturb the load position through one or more of the other degrees of motion. Furthermore positive positioning or a follow-up control mode could not heretofore be employed on extensible boom material handling apparatus having as many as six degrees of motion from a single manipulator.

Accordingly, it is an object of the present invention to provide a positive positioning control system for an extensible boom loader which can be universally manipulated according to the instinctive tendencies of the operator.

Another object of the invention is to provide a plurality of position control systems for an extensible boom material handling apparatus separately responsive to a single manipulator which include follow-up control in each of several of the systems for positively positioning a load.

Still another object of the invention is to provide an extensible pulley-operated control system in which the manipulator can be moved relative to the controlled element without disturbing the position balance thereof.

A further object of the invention is to provide a universal extensible boom loader and control system therefor which is inexpensive to manufacture, simple to assemble, and requires a minimum of maintenance and repair.

Various other objects and advantages will appear from the following description of one embodiment of the invention, and the most novel features will be particularly pointed out hereinafter in connection with the appended claims.

In the drawings:

FIG. 1 represents an isometric view of a mobile extensible boom loader of the present invention, some of the control pulleys and cables therefor being removed;

FIG. 2 represents an enlarged side view of the outer end of the boom of FIG. 1;

FIG. 3 represents a more detailed side view of the outer end of the command unit shown in FIG. 1;

FIG. 4 represents an enlarged view of a portion of the control system for executing boom extension and head depression in the loader of FIG. 1;

FIG. 5 represents an enlarged view of the control system for executing head azimuth in the loader of FIG. 1; and FIG. 6 represents an enlarged view of the control system for executing boom rotation in the loader of FIG. 1.

In the illustrated embodiment of the invention, FIG. 1 represents the general configuration of an aircraft weapons loader capable of supporting and transporting a bomb from a remote storage position to a precise location in an aircraft. The loader chassis comprises a boom carrier apron 10 supported from beneath by two rearwardly positioned steering wheels 11 (only one shown) for maneuvering the loader as desired. The forward portion of the apron 10 is supported at its opposite lateral extremities by a pair of pivoted outriggers 12 having castors 13 at their outer ends. The outriggers 12 can be swiveled laterally so as to prevent the loader from upsetting. A power plant for mobilizing the loader and for generating hydraulic pressure is contained within a vehicle housing 15, and may be of any conventional design and manufacture.

Beside the loader chassis, the loader apparatus may be divided into three assemblies: a telescoping boom 16, a head unit 17, and a command unit 18. In combination, these assemblies make up a mechanical-hydraulic loader capable of positioning a load supported thereon about any of six axes. As will be shown, the boom 16 provides elevation, azimuth, extension, and rotation; and the head unit 17 provides so-called head rotation and head depression which are analogous to roll and pitch respectively. The command unit 18 provides central, manual control for all of these positions of the boom 16 and head unit 17.

The telescoping boom 16 includes an outer housing 19 which is supported on the loader chassis by a boom swivel 21 which in turn is contained in a bell mount 22. The bell mount 22 further includes lateral members for securing the swivel connection of the outriggers 12 to the boom carrier apron 10. Within lateral limits determined by the outriggers 12, the swivel 21 rotates about a boom azimuth axis Y—Y. The telescoping boom 16 is also pivotally connected to the swivel 21 at a boom elevation axis X—X. A boom azimuth hydraulic motor, for rotating the swivel 21 within the bell mount 22 about the axis Y—Y, is mounted underneath the vehicle housing 15 and may be of any conventional design. Power for elevating the outer end of the telescoping boom 16 is obtained from a boom elevation hydraulic motor 24 operatively connected between pivot at the boom elevation axis X—X and the common pivot of linkages 26 connected between the swivel 21 and the housing 19 of the boom 16.

The outer housing 19 contains a spline assembly comprising an outer spline 27 and an inner spline 28 both of which are shown extending from the outer end of the housing 19. A boom extension hydraulic motor 29 operatively connected between the housing 19 and the outer end of the outer spline 27 will produce extension or retraction of the head unit 17 with respect to the pivoted end of the boom 16. A boom rotation hydraulic motor enclosed within housing 19 produces rotation of the inner spline 28 with respect to the outer spline 27 through cam action on an inclined groove. Axial movement of the hydraulic motor thereby causes the inner spline 28 to rotate about a boom rotation axis Z—Z.

Referring also to FIG. 2, it will be seen that the head unit 17, on which the load is secured, comprises a spline-connected section 31 and a load-connected section 32 pivotally connected to each other along the axis N—N. The spline-connected section 31 is further pivoted on the inner spline 28 along the axis M—M. Power for head depression or elevation about the axis M—M is derived from a head depression hydraulic motor 33, and for head rotation about the axis N—N from a head rotation hydraulic motor 34. In the illustrated embodiment, the head unit 17 includes two probes 35 which are adapted to be inserted and secured in corresponding receptacles of the bomb to be supported thereby.

The control or command unit 18 is mounted on the boom 16 in the same orientation by a boom azimuth control support 36 secured to the housing 19 intermediate the ends thereof. The command unit 18 further comprises a plurality of elements connected in series from the control support 36 and terminating in a hand control knob or so-called manipulator 37 at the outer extremity. The elements now to be described are connected so as to permit six distinct degrees of motion to be imparted at the manipulator 37 severally or jointly as desired. A boom elevation control support 38 rotatably connected to the support 36 at the axis Y'—Y' provides a reference axis corresponding to the boom azimuth axis Y—Y and further provides a pivotal connection along an axis X'—X' for a control housing 39, the orientation of which corresponds to the outer housing 19 of the telescoping boom 16 as pivoted on the boom elevation axis X—X. As best seen in FIG. 3, the command unit 18 further includes a telescopic tube 40 slidable relative to the control housing 39 along the axis Z'—Z' which corresponds to the extension and retraction of the outer spline 27 along the axis Z—Z in the boom 16. The telescopic tube 40 pivotally connects a manipulator coupling 41 on an axis M'—M' corresponding to the head depression axis M—M, and finally, the manipulator 37 is pivotally connected within the outer end of the coupling 41 on the axis N'—N' corresponding to the head rotation axis N—N.

Boom Azimuth and Elevation

Boom azimuth and elevation is accomplished with hydraulic motors controlled by direct action on their respective control valves. These valves are spring-biased to a center neutral position at the command unit 18. For boom azimuth positioning about the axis Y—Y, lateral force applied at the axis Y'—Y' in the control support 38, by appropriate action on the manipulator 37, directly operates a boom azimuth control valve 42 which in turn controls a boom azimuth hydraulic motor contained within the vehicle housing 15. This motor is connected to the boom swivel 21 and causes the latter to pivot about the boom azimuth axis Y—Y. Similarly, a vertical force applied at the axis X'—X' in the control support 38, by appropriate action on the manipulator 37, directly operates a boom elevation control valve contained inside the control support 38 thereby operating the boom elevation hydraulic motor 24 to impart pivoting of the boom 16 about the boom elevation axis X—X. Both of these control valves being spring-biased to a center, neutral position, return to the neutrol position the instant the lateral or vertical force is removed and control action ceases.

Unlike boom azimuth and elevation controlled motions, the four remaining degrees of motion (boom extension and rotation and head depression and rotation) further include the aforementioned mechanical feedback or follow-up control action to insure positive positioning of the load. A system of pulleys and hobbed wheels are provided therefore and will now be described.

Boom Extension and Retraction

When the manipulator 37 of the command unit 18 is extended longitudinally outward along the axis Z'—Z', the telescopic tube 40 and coupling 41 are likewise extended in the same direction, carrying with it a hobbed wheel 43 and a pulley 46 journaled in the tube 40 on the axes M'—M' and A—A, respectively. Referring now to the details of the pulley system, shown separately in FIG. 4, one portion of a cable 44 attached on the hobbed wheel 43 passes around the pulley 46, reverses direction and extends around one idler 47 of a so-called second pair of idlers journaled in the housing 39 on an axis B, and then continues around one idler 48 of a so-called first pair of idlers and an idler 49 journaled in the control support 38 at axes C and D. The cable 44 then drives a pulley 51 of a differential 52, reverses direction and passes around idlers 53 and 54, also journaled within the control support 38 at the axes E and F, respectively. From the idler 54, the cable 44 passes around idlers 56 and 57 journaled within the boom azimuth control support 36 and at the outer end of the housing 19 on axes G and H, respectively, reverses direction and connects at the end thereof to the spool of an extension and retraction control valve 58. The spool of the valve 58 is also connected to another cable 44' which in turn passes around an idler 62 coaxial with the idler 56, and then around an idler pulley 63 journaled within the control support 38 at an axis I to be finally fixed at the end thereof to the tube 40 by a cable clamp 64. The other portion of the cable 44 from the wheel 43 extends to another pulley 71 of the differential 52, reverses direction passing around idler 72 and the other idler 73 of the so-called first pair of idlers journaled in the control support 38 at the axes J and C, respectively, then around the other idler 74 of the so-called second pair of idlers at the axis B, and finally terminating at a cable clamp 76 secured to the tube 40. From careful observation, it will become apparent that translation of the wheel 43 and the pulley 46 along the axis Z'—Z' by the manipulator 37, will produce proportional translation of the spool in the valve 58 relative to the outer housing 19, without disturbing the position of the differential 52. The housing of the control valve 58 is connected by a simple pulley arrangement, not shown, to the outer spline 27 to provide for boom extension follow-up. When the spool of the valve 58 moves from a neutral position, the boom extension hydraulic motor 29 accordingly extends the outer spline 27 until the housing of the control valve 58 again establishes the neutral control valve position.

Head Depression and Elevation

Flexure of the head unit 17 about the head depression axis M—M is initiated by pivoting the manipulator 37 of the command unit 18. This operation rotates the wheel 43 on the axis M'—M', causes the pulley 71 of the differential 52 to rotate in the same direction while the cable at the idler 72 remains stationary, thereby translating the differential 52 accordingly without introducing any translation of the control valve 58. Translation of the differential 52 is reproduced by a linkage 78 in a secondary pulley system also having a differential 77 (shown in phantom). The linkage 78 is pivotally connected intermediate its ends to the control housing 39 at the axis K. Following the teaching in the pulley system in the command unit 18, this secondary pulley system thereby connects to the spool of a head depression control valve 30 (FIG. 2) which in turn operates the motor 33 to rotate the spline-connected section 31 of the head unit 17 about the axis M—M until the housing of the control valve 30 reestablishes the neutral position. Then the motor 33 stops.

It should now be apparent that while boom extension and retraction and head depression elevation operate from the same pulley system, their control actions are independent of each other.

Head Rotation

Rotation of the head unit 17 about the rotation axis N—N is initiated by applying a lateral force to the outer end of the manipulator 37. Referring to FIG. 5, the wheel 79, fixed in the manipulator coupling 41 on the axis N'—N' rotates with the manipulator 37 causing the cable 81 to rotate pulleys 86 and 96 of a differential 87. To guide the cable 81 between the manipulator 37 and the telescopic tube 40, idlers 82 and 83 are journaled in coupling 41 and idlers 84, 93, 102 and 103 are journaled in the tube 40 in the orientations illustrated in FIG. 5. Pulleys 101 and 102 and idlers 88, 89, 91, 94, 97 and 98 journaled on the axes A, B, C, D, E and J operate similar to corresponding elements on the same axes relating to boom extension and head depression. In the manner described in connection with head depression, it will be observed that any extension or retraction of the manipulator 37 will not affect the position of differential 87, however rotation of the manipulator 37 and the wheel 79 on the axis N'—N' will cause translation of the differential 87, and through a linkage 104 pivotally connected at the axis K in the control support 36, a differential 110 (shown in phantom) will accordingly move. By a secondary pulley arrangement, not shown, a head rotation control valve 105 will operate the head rotation hydraulic motor 34 to produce head rotation about the axis N—N with mechanical follow-up similar to that disclosed in connection with the extension and retraction control valve 58.

Boom Rotation

Referring to FIG. 6, to rotate the boom the operator angularly displaces the manipulator 37 and the tube 40 about the axis Z'—Z' thereby rotating a drive wheel 106 coaxial with the telescopic tube assembly 41. The drive wheel 106 imparts motion to a cable 107 which ultimately drives pulleys 116 and 123 of the differential 117. Idlers and pulleys 108, 109, 119 and 121 provide directional guides for the cable 107 within the housing 39. Pulley 111 and idlers 112, 113, 114, 118, 122, 124, 126 and 127 are provided on the axes A, B, C, D, E and J for carrying out the extensibility feature described hereinabove in connection with boom extension and head depression. The cable is secured at its ends to clamps 64 and 128. The differential 117 is thus translated in response to a rotation command signal on the manipulator 37. This motion is transformed into a rotary motion on a pulley 129 by a chain and sprocket 136 which in turn drives a separate cable 130 by means of idlers 131, 132, 133 and 134. The spool of a boom rotation control valve (not shown) controls the position of the boom rotation hydraulic motor contained within the outer housing 19. When the inner spline 28 rotates the commanded amount, follow-up restores the neutral valve position thereby providing positive positioning.

It should now be apparent that the present invention provides a sophisticated material handling apparatus having high versatility, rapid repsonse and precise positioning characteristics. By utilizing a telescoping rotary boom construction with six degrees of freedom, the boom is capable of placing a load anywhere in space within the boom's reach. Each degree of motion can be imparted independently or simultaneously as required by means of its integrated position control system. The present invention also permits the operator to view the load with respect to the desired position and then, according to his instinctive tendencies, manipulate the command unit in the same manner as he would move the load in the absence of any power equipment.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A universal weapons loader and control system therefor comprising:
   a vehicular chassis having adjustable outriggers thereon;
   a telescoping boom having a swivel centrally supported in said chassis on a substantially horizontal boom azimuth axis, an outer housing pivotally supported from said swivel on a substantially horizontal boom elevation axis normal to the boom azimuth axis, an outer spline slidably contained within said housing for extending the outer end of said boom, and an inner spline rotatably supported within said outer spline for rotating the outer end of said boom;
   a head unit having a head coupling pivotally connected at the outer end of said boom to said inner spline on a head depression axis normal to the boom axis, and a weapons connector pivotally connected to said head coupling on a head rotation axis normal to the head depression axis;
   a command unit having a boom elevate control support pivotally connected to said outer housing on a command azimuth axis normal to said boom axis and in a substantially vertical plane, a control housing pivotally connected in said control support on a command elevation axis normal to the command azimuth axis and in a substantially horizontal plane, a telescopic tube slidably contained within said control housing, a manipulator coupling pivotally connected to the outer end of said tube on a manipulator depression axis normal to the length of said tube, and a manipulator pivotally connected in said coupling on a manipulator rotation axis normal to the length of said tube and to the manipulator depression axis;
   first control means operatively connected between said control support and said swivel for causing boom rotation about the boom azimuth axis;
   a second control means operatively connected between said control housing and said outer housing for pivoting said boom about the boom elevation axis;
   a third control means operatively connected between said telescopic tube and said outer spline for extending and retracting said outer spline along the boom axis;
   fourth control means operatively connected between said telescopic tube and said inner spline for rotating the outer end of said boom about the boom axis;
   fifth control means operatively connected between said manipulator coupling and said head coupling for rotating the latter about the head depression axis; and
   sixth control means operatively connected between said manipulator and said load connector for rotating the latter about the head rotation axis;
   said third, fourth, fifth and sixth control means each including an extensible pulley system for transmitting control signals independent of each other, and a follow-up control linkage for positive positioning thereof.

2. A universal loader and control system therefor, comprising:
   a vehicular chassis,
   a telescoping boom having a swivel centrally supported in said chassis on a substantially horizontal boom azimuth axis, an outer housing pivotally supported from said swivel on a substantially horizontal boom elevation axis normal to the boom azimuth axis, an outer spline slidably supported within said housing for extending the outer end of said boom, and an inner spline rotatably supported within said outer spline for rotating the outer end of said boom;
   a head unit having a head coupling pivotally connected at the outer end of said boom to said inner spline on a head depression axis normal to the boom axis, and a load connector pivotally connected to said coupling on a head rotation axis normal to the head depression axis;

a command unit having a boom elevate control support pivotally connected to said outer housing on a command azimuth axis normal to said boom axis and in a substantially vertical plane, a control housing pivotally connected in said control support on a command elevation axis normal to the command azimuth axis and in a substantially horizontal plane, a telescopic tube slidably supported within said control housing, a manipulator coupling pivotally connected to the outer end of said tube on a manipulator depression axis normal to the length of said tube, and a manipulator pivotally connected in said coupling on a manipulator rotation axis normal to the length of said tube and to the manipulator depression axis;

first and second control means operatively connected between said command unit and said boom for causing boom rotation about the boom azimuth and elevation axes, respectively;

third control means operatively connected between said command unit and said boom for extending and retracting the outer end thereof along the boom axis;

fourth control means operatively connected between said command unit and said boom for rotating the outer end of said boom about the boom axis; and fifth and sixth control means operatively connected between said command unit and said head unit for rotating the latter about the head depression and head rotation axes;

said third, fourth, fifth and sixth control means each including an extensible pulley system for transmitting a control system independent of each other.

3. A material handling apparatus and control system therefor, comprising:

a chassis;

a telescoping boom pivotally connected to said chassis for rotation on boom azimuth and elevation axes, respectively;

a head unit having a head coupling pivotally connected to the outer end of said boom on a head depression axis normal to the boom axis, and a load connector pivotally connected to said head coupling on a head rotation axis normal to the head depression axis;

a command unit having a boom control housing pivotally connected to said boom on command azimuth and elevation axes, a telescopic tube slidably contained within said control housing, a manipulator pivotally connected to the outer end of said tube on manipulation depression and rotation axes;

first and second control means operatively connected between said command unit and said boom for causing boom rotation about the boom azimuth and elevation axes;

third control means operatively connected between said command unit and said boom for extending and retracting the outer end thereof along the boom axis;

a fourth control means operatively connected between said command unit and said boom for rotating the outer end of said boom about the boom axis; and fifth and sixth control means operatively connected between said command unit and said head unit for rotating the latter about the head depression and rotation axes;

said third, fourth, fifth and sixth control means each including an extensible pulley system for transmitting a control signal independent of the others.

4. A material handling apparatus and control system therefor, comprising:

a chassis;

a telescoping boom universally swiveled to said chassis;

a head unit universally connected at the outer end of said boom;

a command unit universally swiveled to said boom having a universally swiveled manipulator;

first control means operatively connected between said command unit and said boom for causing boom rotation about its swivel connection;

second control means operatively connected between said command unit and said head unit for extending and retracting said boom and for rotating said head unit about its swivel connection; and said second control means including an extensible pulley system for transmitting a control signal independent of said first control means.

5. In a universal weapons loader, the combination of a master control assembly and a telescoping slave assembly capable of corresponding multiple motions;

a manipulator for operating said master assembly, a load connector carried at the outer end of said slave assembly;

a plurality of hydraulic means interconnecting adjacent movable members of said slave assembly and said load connector for positioning said load connector with six degrees of motion;

a plurality of extensible pulley systems respectively interconnecting said master control assembly and said hydraulic means for positioning said load connector in accordance with motion imparted to said manipulator.

6. An extensible pulley system, comprising:

a first elongated member having first and second pairs of idlers rotatably mounted on axes spaced along the length thereof;

a second elongated member slidable along the length of said first member having a movable pulley rotatably mounted near one end thereof and positioned between said first and second pairs of idlers, and a drive wheel rotatably mounted near the other end thereof;

differential means disposed between said second pair of idlers and said pulley and having first and second pulleys rotatably mounted adjacent to each other along the length thereof;

a first cable portion secured to the periphery of said drive wheel, passing respectively around said first differential pulley and around one each of said first and second pair of idlers, and securing to said second member adjacent to said movable pulley;

a second cable portion secured to the periphery of said drive wheel, passing respectively around said movable pulley, around each of the other of said second and first pair of idlers around said second differential pulley, and securing to said second member near said drive wheel;

whereby said differential remains stationary when said second member is moved relative to said first member, and traverses when said drive wheel is rotated.

References Cited in the file of this patent

UNITED STATES PATENTS

| | | |
|---|---|---|
| 1,267,130 | Skeith | May 21, 1918 |
| 2,979,212 | Dragonuk | Apr. 11, 1961 |
| 2,992,746 | Olson | July 18, 1961 |
| 3,065,863 | Saunders | Nov. 27, 1962 |
| 3,087,630 | Karnow | Apr. 30, 1963 |

FOREIGN PATENTS

| | | |
|---|---|---|
| 1,083,476 | France | Jan. 10, 1955 |